US012597734B2

(12) United States Patent
Tang

(10) Patent No.: US 12,597,734 B2
(45) Date of Patent: Apr. 7, 2026

(54) UNIVERSAL ELECTRICAL PLUG

(71) Applicant: Likui Tang, Dongguan (CN)

(72) Inventor: Likui Tang, Dongguan (CN)

( * ) Notice: Subject to any disclaimer, the term of this patent is extended or adjusted under 35 U.S.C. 154(b) by 340 days.

(21) Appl. No.: 18/467,754

(22) Filed: Sep. 15, 2023

(65) Prior Publication Data

US 2024/0006806 A1 Jan. 4, 2024

(51) Int. Cl.
*H01R 13/62* (2006.01)
*H01R 24/30* (2011.01)
*H01R 103/00* (2006.01)

(52) U.S. Cl.
CPC ............. *H01R 13/62* (2013.01); *H01R 24/30* (2013.01); *H01R 2103/00* (2013.01)

(58) Field of Classification Search
CPC ...... H01R 13/62; H01R 13/639; H01R 24/30; H01R 2103/00
See application file for complete search history.

(56) References Cited

U.S. PATENT DOCUMENTS 5,941,724 A * 8/1999 Reed .................... H01R 4/5091 439/346
6,050,837 A * 4/2000 Duhe, Jr. ........... H01R 13/6397 439/270
6,419,504 B1 * 7/2002 Nelson ................. H01R 13/652 439/103
7,077,683 B1 * 7/2006 Ross .................. H01R 13/6395 439/346
7,347,703 B2 * 3/2008 Gallardo ............ H01R 13/6397 439/373
7,798,838 B2 * 9/2010 Grieff .................. H01R 13/639 439/692
8,808,014 B2 * 8/2014 Hsu ........................ H01R 13/41 439/373
10,493,694 B2 * 12/2019 Takahashi ............. B29C 64/153
11,005,214 B2 * 5/2021 Edwards ................ H01R 13/20
2005/0250375 A1 11/2005 Allison
2019/0229479 A1 7/2019 Judkins et al.
2022/0131315 A1 4/2022 Wang

* cited by examiner

*Primary Examiner* — Harshad C Patel
(74) *Attorney, Agent, or Firm* — Hemisphere Law, PLLC

(57) ABSTRACT

The present disclosure provides a universal electrical plug, including a shell, a pin, a guide portion, a movable locking bar, and an actuating component. The pin is configured to be plugged into an adaptive jack of a socket to achieve electrical connection. The pin is fixed to the shell; the pin is provided with a receiving slot; and one side surface of the pin forms an open surface of the receiving slot. The locking bar can be in a loose or locked position. The actuating component is connected to the locking bar and is configured to drive the locking bar to move and maintain the locking bar in the locked position to cause a protruding portion of the locking bar to be frictionally locked in the jack. The present disclosure can be used in conjunction with a universal socket and achieve locking.

8 Claims, 7 Drawing Sheets

UNIVERSAL ELECTRICAL PLUG

TECHNICAL FIELD

The present disclosure relates to the technical field of connectors, and in particular, a universal electrical plug.

BACKGROUND

An electrical plug is connected to a socket to power on electric equipment. The power is cut off after the electrical plug is separated from the socket. In some special places, it is necessary to maintain a stable electrical connection state between an electrical plug and a socket. Therefore, a locking structure will be arranged on the electrical plug to lock the electrical plug to the socket.

The locking structure may be set to be a buckle structure. An elastic buckle is usually arranged on the electrical plug, and then a bayonet matched with the elastic buckle is arranged on the socket. During use, the elastic buckle would enter the bayonet to connect and fix the electrical plug to the socket. This type of electrical plug is paired with a socket, and cannot be paired with a universal socket.

SUMMARY

In view of this, in order to solve one of the technical problems in the related art to a certain extent, it is necessary to provide a universal plug, which can be used in conjunction with a universal socket to achieve locking. A pin is plugged into and pulled out of a jack of the socket without obstruction, and powering on of the pin is not affected during locking.

The present disclosure specifically provides a universal electrical plug. The electrical plug includes:

- a shell;
- a pin, wherein the pin is configured to be plugged into an adaptive jack of a socket to achieve electrical connection; the pin is fixed to the shell; the pin is provided with a receiving slot; one side surface of the pin forms an open surface of the receiving slot;
- a guide portion;
- a movable locking bar, wherein the movable locking bar is in a loose or locked position; when the locking bar is in the loose position, the locking bar is received in the receiving slot; when the locking bar is in the locked position, the locking bar is pushed out by the guide portion and at least partially protrudes out of the open surface; and
- an actuating component, connected to the locking bar and configured to drive the locking bar to move and maintain the locking bar in the locked position to cause a protruding portion of the locking bar to be frictionally locked in the jack.

Further, the guide portion is a part of the pin and is located on an outer side of the shell.

Further, the guide portion is provided with a first guide slope; the locking bar is provided with a second guide slope corresponding to the first guide slope; and when the locking bar is in the locked position, the second guide slope is acted on by the first guide slope to cause the locking bar to at least partially protrude out of the open surface.

Further, the locking bar includes a thinned portion; and when the locking bar is in the locked position, the guide portion acts on the locking bar to bend the thinned portion.

Further, one surface of the locking bar facing the guide portion is sunken to form a concave groove; the thinned portion corresponds to a position of the concave groove; a front inner side surface of the concave groove is the second guide slope; and the locking bar includes a thickened portion located at a rear end of the concave groove.

Further, when the locking bar is in the locked position, a front end portion of the locking bar protrudes out of the open surface.

Further, the electrical plug further includes a limiting portion; the limiting portion faces a surface of the locking bar and is opposite to the guide portion; and the limiting portion restricts the protrusion of the locking bar in the protruding process.

Further, when the locking bar is in the loose position, the surface is parallel to the open surface.

Further, when the locking bar is in the loose position, the surface is coplanar with the open surface.

Further, the receiving slot includes two opposite limiting surfaces; and the limiting surfaces are configured to prevent the locking bar from moving towards a side surface perpendicular to a push-out direction.

According to the universal electrical plug provided according to the present disclosure, the receiving slot is formed in the pin. When the locking bar is in the loose position, the locking bar is received in the receiving slot, so that the pin can be smoothly plugged into and pulled out of the adaptive jack of the socket. After the pin is plugged into the jack, the actuating component drives the locking bar to move. The actuating component keeps the portion of the locking bar protruding out of the open surface being frictionally locked to the jack to achieve locking between the socket and plugs. Therefore, the electrical plug of the present disclosure can be used in conjunction with the universal socket, instead of a socket with a specific structure, so that the universality and connection reliability of the electrical plug are improved.

Figure 1:
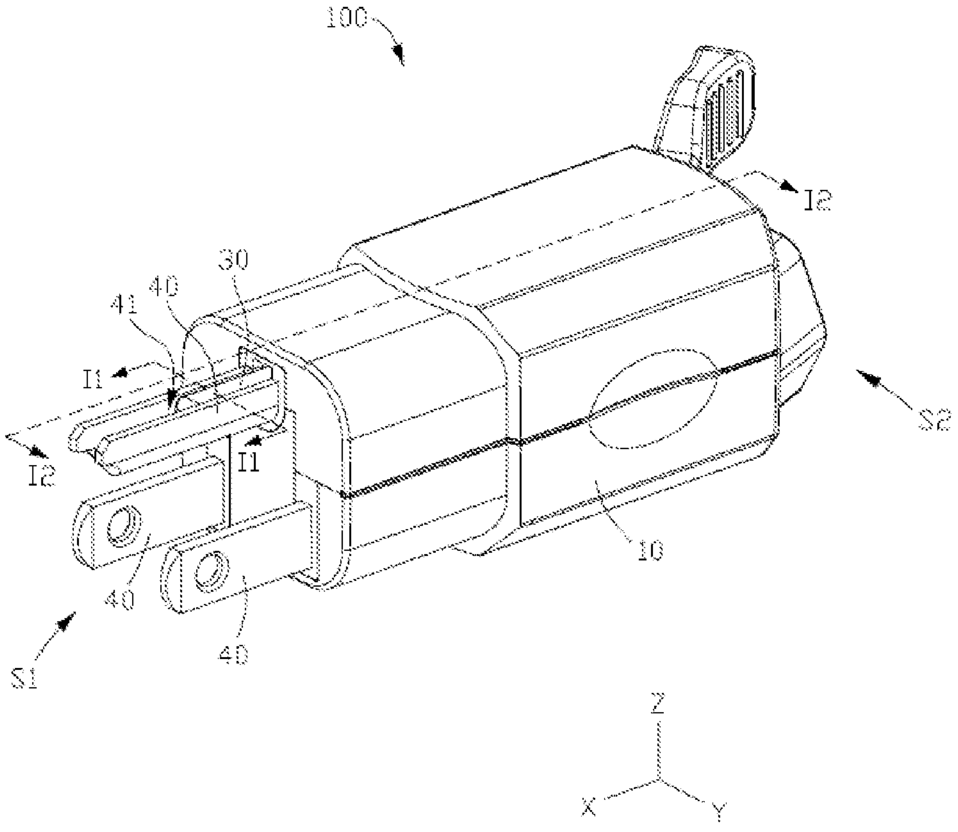
FIG. 1 is a schematic structural diagram of a first implementation of the present disclosure.

The present disclosure will be further described in the following specific implementation modes with reference to the above accompanying drawings.

DETAILED DESCRIPTION OF THE EMBODIMENTS

The technical solutions in the embodiments of the present disclosure will be described clearly and completely below in combination with the accompanying drawings of the embodiments of the present disclosure. Apparently, the described embodiments are only part of the embodiments of the present disclosure, not all embodiments. Based on the embodiments in the present disclosure, all other embodiments obtained by those of ordinary skill in the art without creative efforts shall fall within the protection scope of the present disclosure. It can be understood that the drawings are only provided for reference and illustration, and are not used to limit the present disclosure. The connection relationships shown in the drawings are only for the convenience of clear description, and do not limit the connection methods.

FIG. 1 shows a schematic structural diagram of an electrical plug provided according to a first implementation of the present disclosure. As shown in FIG. 1, indefinitedly, X represents a front-back direction; Y represents a left-right direction; and Z represents a vertical direction.

Figure 2:
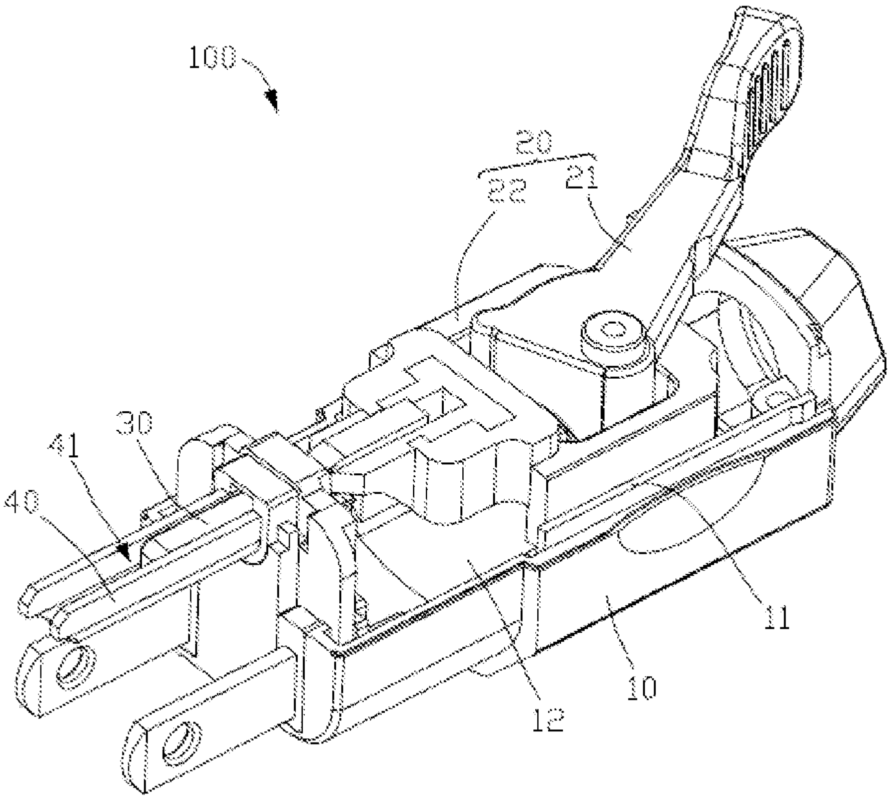
FIG. 2 shows an internal structure of FIG. 1.

As shown in FIG. 2 together, FIG. 2 shows an internal structure of an electrical plug 100. The electrical plug 100 belongs a male plug, including a shell 10, an actuating component a locking bar 30, and a plurality of pins 40. The shell 10 includes a front end S1 and a rear end S2. The pins 40 are fixed to the shell 10. The pins 40 extend from the shell 10 to the front end of the shell 10. The pins 40 are connected to wires from inside the shell 10, and the wires extend out of the rear end of the shell 10 to form a cable. The plurality of pins 40 can be plugged into jacks of a socket and then come into contact with conducting strips inside the socket to achieve electrical conduction.

Figure 3:
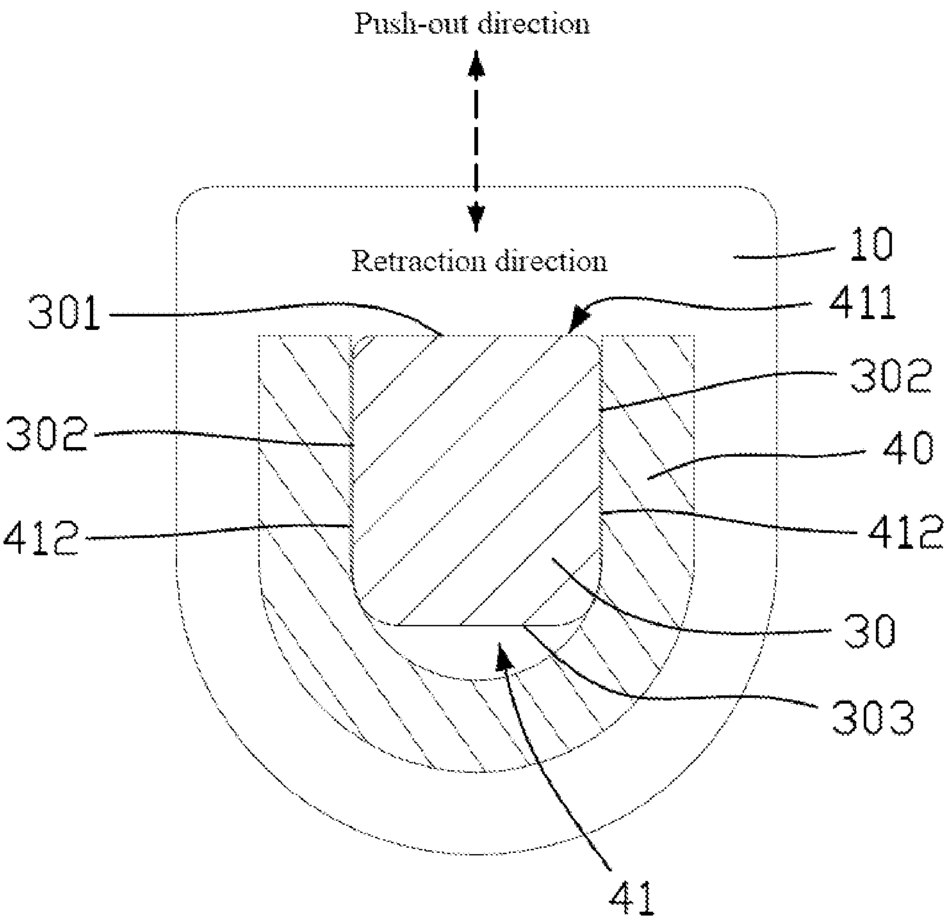
FIG. 3 is a cutaway view of FIG. 1 along line I1-I1.
Figure 6:
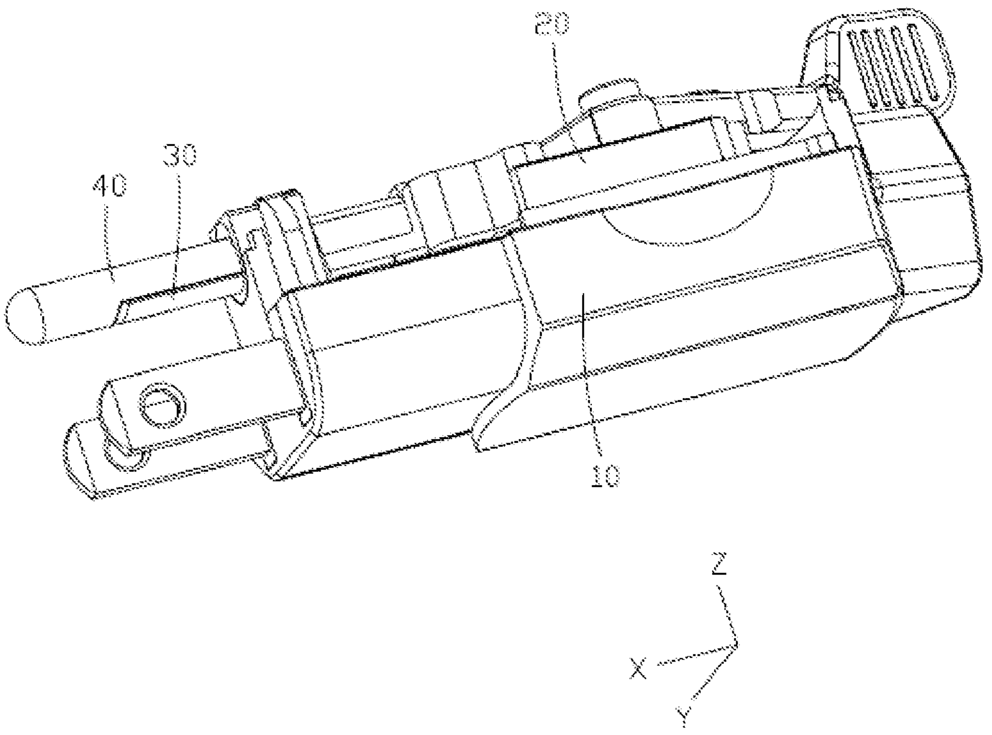
FIG. 6 is a partially structural diagram of a second implementation of the present disclosure.
Figure 7:
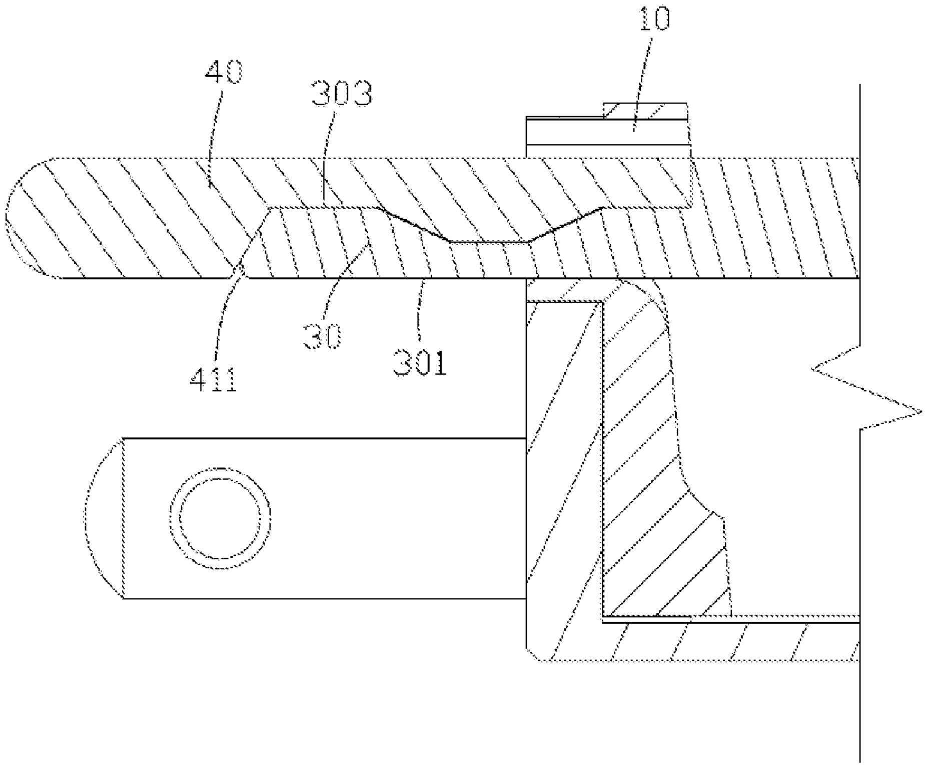
FIG. 7 is a partially structural cutaway view along an XZ surface of FIG. 6.

As shown in FIG. 3 together, FIG. 3 shows a cutaway view of surface 1141 of FIG. 1. At least one pin 40 is provided with a receiving slot 41, and an inner end of the receiving slot 41 extends and penetrates through an inner end of the pin 40. One side surface 411 of the pin 40 forms an open surface 411 of the receiving slot 41, and the open surface 411 is configured to allow the protrusion of the locking bar 30. In the first implementation, as shown in FIG. 1 to FIG. 3, the side surface 411 is a top surface of the pin 40. In the second implementation, as shown in FIG. 6 to FIG. 7, the side surface 411 is a bottom surface. In other implementations, the side surface 411 can also be a left or right side surface.

A cross-sectional profile of the locking bar 30 along a YZ plane can be the same as a cross-sectional profile of the receiving slot 41 in shape. The locking bar 30 includes a surface 301, a side surface 302, and a back surface 303 corresponding to the open surface 411. The receiving slot 41 includes two opposite limiting surfaces 412. The limiting surfaces 412 correspond to the side surface 302 of the locking bar 30. The limiting surfaces 412 are configured to prevent the locking bar 30 from moving towards a side surface perpendicular to a push-out direction, which ensures that movement directions of the locking bar 30 include the front-back direction, the push-out direction, and a retraction direction, so as to ensure that the locking bar 30 does not deviate during movement.

A cross-sectional profile of the pin 40 along the YZ plane can be U-shaped or Circular which is suitable for matching the shape of the jack of the universal socket. A structure of the U-shaped pin 40 can be seen in FIG. 1 to FIG. 3 of the first implementation, and a structure of the Circular pin 40 can be seen in FIG. 5 and FIG. 7 of the second implementation. A top surface of the pin 40 with a U-shaped profile is a plane, and the open surface 411 is formed on the top surface. A bottom surface of the pin 40 with a circular profile is an arc surface, and the open surface 411 is formed on the bottom surface.

The actuating component 20 is arranged in the shell 10. The actuating component 20 can be a screwed actuating component, a handle type actuating component, or the like. There is no restriction here. The screwed actuating component converts threaded rotation into linear motion, while the handle type actuating component converts rotation of a rotating shaft into linear motion.

The actuating component 20 includes a driving member 21 and a driven member 22. The driving member 21 can be a nut or a handle, for example, and the driving member 21 is an object to which an operator applies a force. The driven member 22 is driven by the driving member 21, and moves back and forth through the driving member 21.

In this implementation, the actuating component 20 is a handle type actuating component, which includes a driving handle 21 and a moving block 22 (the driven member 22). During rotation of the handle 21, a convex portion on the handle 21 pushes the moving block 22 to move back and forth.

A track 11 is arranged inside the shell 10, and the driven member 22 is arranged in the track 11 to slide back and forth. There is a space 12 below the track 11, which is configured to receive the wires connected to the pins 40.

The locking bar 30 is fixedly connected to the actuating component 20. Specifically, the locking bar 30 is directly fixedly connected to the driven member 22, and a forward and backward movement distance of the driven member 22 is equal to a forward and backward movement distance of the locking bar 30. The locking bar 30 can be integrally formed with the driven member 22, or the locking bar 30 and the driven member 22 can be split and are formed by embedding or twice molding.

An inner end of the locking bar 30 is located inside the shell 10, and an outer end of the locking bar 30 extends to the front end of the shell 10 through an opening in the front end of the shell 10.

Figure 4:
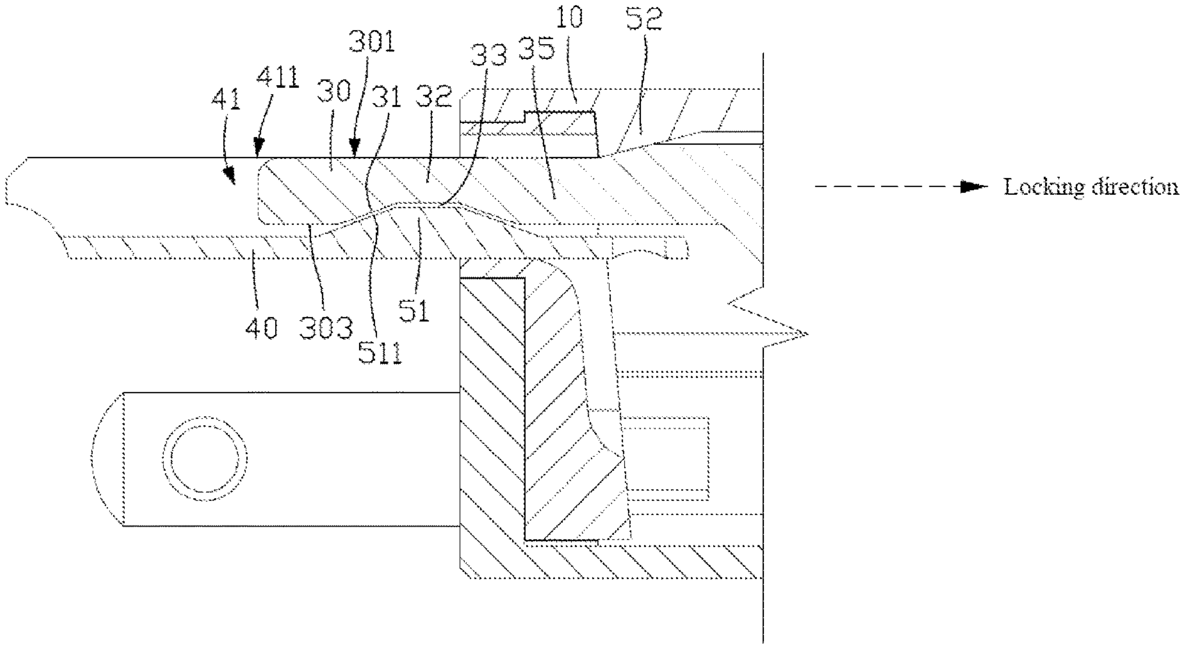
FIG. 4 is a partially structural cutaway view when a locking bar is in a loose position along line I2-I2 in FIG. 1.
Figure 5:
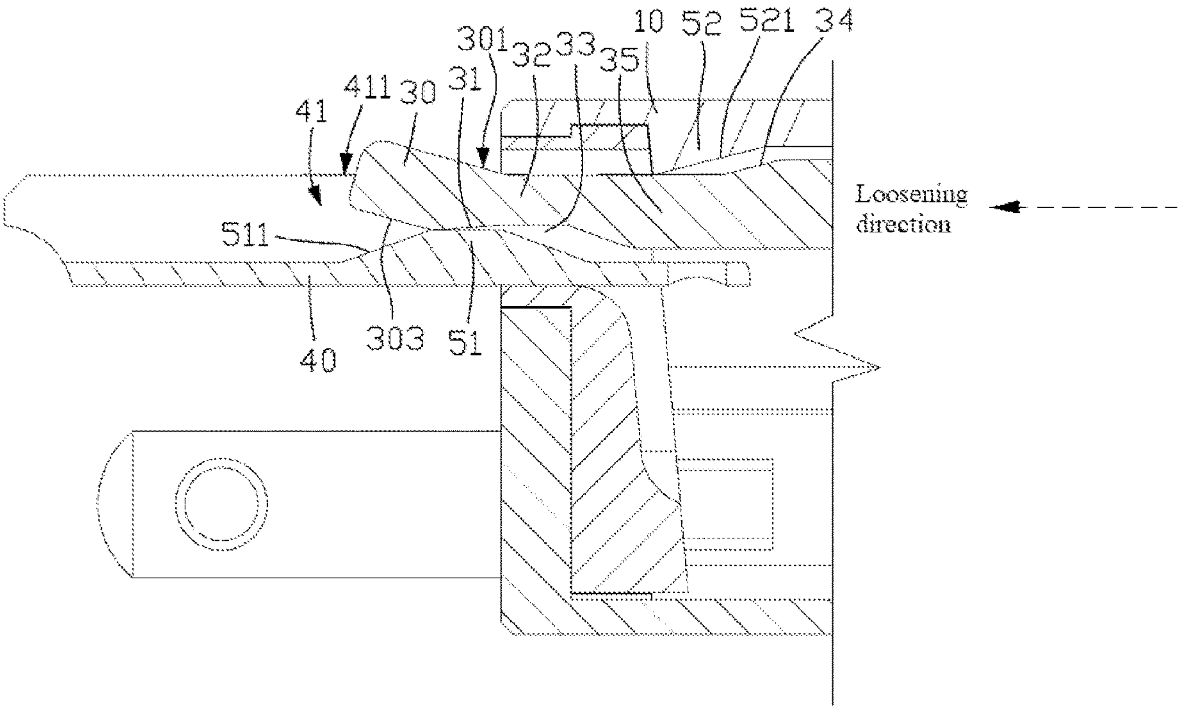
FIG. 5 is a partially structural cutaway view when a locking bar in a locked position in FIG. 1.

The locking bar 30 can be in a loose or locked position, and a state in the loose position can be seen in FIG. 4, while a state in the locked position can be seen in FIG. 5.

When the locking bar 30 is in the loose position, the locking bar 30 is received in the receiving slot 41, and the pins 40 can be smoothly plugged in and pulled out of the jacks. When the locking bar 30 is in the locked position, the locking bar 30 is pushed out by a guide portion 51 and at least partially protrudes out of the open surface 411. The protruding portion will be frictionally locked to the jack. Preferably, the protruding portion protrudes more than 1 mm out of the open surface 411. Preferably, the surface 301 of the locking bar 30 can be parallel to the open surface 411. More preferably, the surface 301 is coplanar with the open surface 411, which can minimize a travel of the locking bar 30 in the protruding process without obstructing the pins 40 from being plugged into and pulled out of the jacks, or the surface 301 is lower than the open surface 411.

The electrical plug 100 can be used in conjunction with a universal socket, instead of a socket with a special structure, which improves the universality and connection reliability of the electrical plug 100.

When driven by the actuating component 20, the locking bar 30 can move between the loose position and the locked position. In this implementation, the locking bar 30 tends to be loose towards a front end direction, and the locking bar 30 tends to be locked towards a rear end direction.

In the process that the locking bar 30 moves from the loose position to the locked position, the locking bar 30 will interact with the guide portion 51 and be pushed out of the open surface 411 through the guide portion 51. At the same time, the locking bar 30 can tilt slightly. In the process that the locking bar 30 moves from the locked position to the loose position, the locking bar 30 is guided by the guide portion 52 to move to the loose position.

In this implementation, the guide portion 51 is a part of the pin 40 and is located on an outer side of the shell 10. Specifically, the guide portion 51 can be located at a bottom of the receiving slot 41 and correspond to the back surface 303 of the locking bar 30. In this way, a distance between the guide portion 51 and a friction locking point (the protruding portion of the locking bar 30) is short and the guide portion 51 can more directly provide a support force for the protruding portion of the locking bar 30, so that a friction force at the locking point is as high as possible, and the locking effect is enhanced. In other implementations, the guide portion 51 can also be arranged on the shell 10.

The guide portion 52 can be located on the shell 10, or the guide portion 52 can be located on the pin 40.

The guide portion 51 is provided with a first guide slope 511, and the locking bar 30 is provided with a second guide slope 31 corresponding to the first guide slope 511. In the movement process of the locking bar 30, the second guide slope 31 gradually interacts with the first guide slope 511. The locking bar 30 may gradually protrude out of the open surface 411. When the locking bar 30 is in the locked position, the second guide slope 31 is acted on by the first guide slope 511, which ultimately causes the locking bar 30 to protrude out of the open surface 411 to the largest extent.

The first guide slope 511 and the second guide slope 31 gradually tilt towards the open surface 411 from front to back.

The locking bar 30 includes a thinned portion 32. When the locking bar 30 is in the locked position, the guide portion 51 jacks up the locking bar 30, and the locking bar 30 bends at the thinned portion 32, causing the locking bar 30 to partially protrude out of the open surface 411. When the locking bar 30 is in the loose position, the thinned portion 32 will automatically restore its original shape.

Specifically, one surface (the back surface 303) of the locking bar 30 facing the guide portion 51 is sunken to form a concave groove 33. A portion of the locking bar 30 corresponding to a bottom surface of the concave groove 33 is the thinned portion 32. A front side surface of the concave groove 33 is the second guide slope 31. By the arrangement of the concave groove 33, it is convenient to form both the thinned portion 32 and the second guide slope 31. When the locking bar 30 is in the locked position, a front end portion of the locking bar 30 is raised and protrudes out of the open surface 411.

The locking bar 30 includes a thickened portion 35 located at a rear end of the concave groove 33. The thickened portion 35 refers to a thickness greater than a thickness of the thinned portion 32. In the process that the locking bar 30 moves forward from a locked state to a loose state, the thickened portion 35 can provide a stronger and more stable forward pushing force for the thinned portion 32, which is beneficial for an end portion of the locking bar 30 to retract and restore deformation.

The guide portion 51 is a convex block protruding towards the open surface 411. When the locking bar 30 is in the loose state, the guide portion 51 is received in the concave groove 33.

In this implementation, the guide portion 52 is located on the shell 10. Of course, in other implementations, the guide portion 52 can be located on the pin 40.

As shown in FIG. 5, the guide portion 52 is provided with a first guide surface 521. The locking bar 30 is provided with a second guide surface 34 corresponding to the first guide surface 521. Due to the cooperation between the first guide surface 521 and the second guide surface 34, the locking bar 30 moves from the locked position to the loose position.

Correspondingly, tilting direction of the first guide surface 521 and the second guide surface 34 are the same as a tilting direction of the first guide slope 511, and their tilting angles can also be the same.

The guide portion 52 faces the surface 301 of the locking bar 30, and the guide portion 52 is arranged opposite to the guide portion 51. The guide portion 52 also serves as a limiting portion. When the locking bar 30 protrudes to a certain extent, the surface 301 of the locking bar 30 will come into contact with the guide portion 52. If the locking bar 30 continues to protrude, the guide portion 52 will restrict the protrusion of the locking bar 30, and then the locking bar 30 will tilt with the guide portion 52 serving as a fulcrum.

The above descriptions are only the preferred embodiments of the present disclosure, and are not intended to limit the present disclosure. Any modifications, equivalent replacements and improvements that are made within the spirit and principle of the present disclosure shall fall within the protection scope of the present disclosure.

What is claimed is:

1. A universal electrical plug, wherein the electrical plug comprises:

a shell;

a pin, wherein the pin is configured to be plugged into an adaptive jack of a socket to achieve electrical connection; the pin is fixed to the shell; the pin is provided with a receiving slot; one side surface of the pin forms an open surface of the receiving slot;

a guide portion;

a movable locking bar, wherein the movable locking bar is in a loose or locked position; when the locking bar is in the loose position, the locking bar is received in the receiving slot; when the locking bar is in the locked position, the locking bar is pushed out by the guide portion and at least partially protrudes out of the open surface; and an actuating component, connected to the locking bar and configured to drive the locking bar to move and maintain the locking bar in the locked position to cause a protruding portion of the locking bar to be frictionally locked in the jack;

wherein the guide portion is a part of the pin and is located on an outer side of the shell; the guide portion is provided with a first guide slope; the locking bar is provided with a second guide slope corresponding to the first guide slope; and when the locking bar is in the locked position, the second guide slope is acted on by the first guide slope to cause the locking bar to at least partially protrude out of the open surface.

2. The universal electrical plug according to claim 1, wherein the locking bar comprises a thinned portion; and when the locking bar is in the locked position, the guide portion acts on the locking bar to bend the thinned portion.

3. The universal electrical plug according to claim 2, wherein one surface of the locking bar facing the guide portion is sunken to form a concave groove; the thinned portion corresponds to a position of the concave groove; a front inner side surface of the concave groove is the second guide slope; and the locking bar comprises a thickened portion located at a rear end of the concave groove.

4. The universal electrical plug according to claim 3, wherein when the locking bar is in the locked position, a front end portion of the locking bar protrudes out of the open surface.

5. The universal electrical plug according to claim 2, wherein the electrical plug further comprises a limiting portion; the limiting portion faces a surface of the locking bar and is opposite to the guide portion; and the limiting portion restricts the protrusion of the locking bar in the protruding process.

6. The universal electrical plug according to claim 5, wherein when the locking bar is in the loose position, the surface is parallel to the open surface.

7. The universal electrical plug according to claim 6, wherein when the locking bar is in the loose position, the surface is coplanar with the open surface.

8. The universal electrical plug according to claim 1, wherein the receiving slot comprises two opposite limiting surfaces; and the limiting surfaces are configured to prevent the locking bar from moving towards a side surface perpendicular to a push-out direction.

* * * * *